United States Patent
Gulchenko

(10) Patent No.: US 10,043,176 B2
(45) Date of Patent: Aug. 7, 2018

(54) ONLINE TRANSACTION SYSTEM

(71) Applicant: SQWIN SA, Auvernier (CH)

(72) Inventor: Victor Gulchenko, Frankfurt (DE)

(73) Assignee: SQWIN SA, Auvernier (CH)

( * ) Notice: Subject to any disclaimer, the term of this patent is extended or adjusted under 35 U.S.C. 154(b) by 0 days.

(21) Appl. No.: 14/653,521

(22) PCT Filed: Dec. 4, 2013

(86) PCT No.: PCT/EP2013/075461
§ 371 (c)(1),
(2) Date: Jun. 18, 2015

(87) PCT Pub. No.: WO2014/095362
PCT Pub. Date: Jun. 26, 2014

(65) Prior Publication Data
US 2015/0348013 A1   Dec. 3, 2015

(30) Foreign Application Priority Data

Dec. 21, 2012  (DE) .................. 10 2012 112 967

(51) Int. Cl.
*G06Q 20/20*  (2012.01)
*G06Q 20/32*  (2012.01)
(Continued)

(52) U.S. Cl.
CPC .......... *G06Q 20/347* (2013.01); *G06F 21/42* (2013.01); *G06Q 20/20* (2013.01); *G06Q 20/32* (2013.01);
(Continued)

(58) Field of Classification Search
USPC ............................................. 705/18, 44, 17
See application file for complete search history.

(56) References Cited

U.S. PATENT DOCUMENTS 8,326,759 B2   12/2012  Hammad
2006/0069916 A1*  3/2006  Jenisch ............... H04L 63/0846
                                                    713/172

(Continued)

FOREIGN PATENT DOCUMENTS

WO   2006008559   1/2006
WO   2007026212   3/2007
WO   2008050132   5/2008

OTHER PUBLICATIONS

English Translation of International Preliminary Report on Patentablility dated Jul. 2, 2015.
(Continued)

*Primary Examiner* — Scott A Zare
*Assistant Examiner* — Reva R Danzig
(74) *Attorney, Agent, or Firm* — Renner, Otto, Boisselle & Sklar, LLP

(57) ABSTRACT

A method for performing a digital transaction via a mobile device using a POS system that is connected to a wireless local area network comprising the steps: generation of a unique one-time digital code by the POS system (or by the mobile device of the customer) that is used for initiating the transaction; automatic enabling of network access to the wireless local area network after production of the unique one-time digital code, wherein access to the wireless network is permitted by the digital code; connection of the mobile device to the local area network using the digital code and provision of information from the device to the POS system, after the information has been obtained by the POS system from the mobile device, the POS system provides clearance for the transaction.

20 Claims, 4 Drawing Sheets

(51) Int. Cl.
*G06Q 20/40* (2012.01)
*G06F 21/42* (2013.01)
*G06Q 20/34* (2012.01)
*G06Q 20/38* (2012.01)
*G06Q 20/42* (2012.01)

(52) U.S. Cl.
CPC ....... *G06Q 20/327* (2013.01); *G06Q 20/3276* (2013.01); *G06Q 20/3278* (2013.01); *G06Q 20/385* (2013.01); *G06Q 20/40* (2013.01); *G06Q 20/425* (2013.01)

(56) References Cited

U.S. PATENT DOCUMENTS

| | | | |
|---|---|---|---|
| 2008/0077527 A1 | 3/2008 | Choe et al. | |
| 2009/0288012 A1 | 11/2009 | Hertel et al. | |
| 2010/0028160 A1 | 2/2010 | Roeding et al. | |
| 2010/0223145 A1 | 9/2010 | Dragt | |
| 2010/0274721 A1 | 10/2010 | Hammad | |
| 2011/0078031 A1* | 3/2011 | Mardikar | G06Q 20/20 705/17 |
| 2013/0091059 A1* | 4/2013 | Stals | G06Q 20/02 705/44 |
| 2013/0268378 A1* | 10/2013 | Yovin | G06Q 20/204 705/18 |

OTHER PUBLICATIONS

German Search Report dated Jun. 17, 2013.
International Search Report dated Feb. 26, 2014.

\* cited by examiner

ONLINE TRANSACTION SYSTEM

BACKGROUND

1. Field of the Invention

The invention relates to an online transaction system.

2. Description of the Related Art

A financial transaction system is a computer-aided application system with which predominantly cashless transactions are performed. As a rule, these systems are based on database systems with which transactions are executed. There are safeguards to ensure that a database always has the correct status for the proper implementation of a transaction. For mobile payments or monetary transactions, it is important to establish the identity of the party making the payment and to avoid unauthorised use. WO 2008/050132 A2 discloses a method with which the transaction data are transferred in parallel by a mobile device and a point of sale (POS) system and only executed when both sets of data are identical.

WO 2010/129357 A2 discloses a method for providing dynamic card verification for mobile terminals.

SUMMARY OF THE INVENTION

The principle of the present invention is the separation of the information flows from the purchaser and vendor at the time of the purchase. Each party sends its information package to the payment system via its communication channel. Therefore, on each purchase, two independent information packages are sent to the payment system.

Here, each information package contains an obligatory element—a unique one-time number on the sales receipt (hereinafter—"a unique one-time digital code" or "sales receipt" or "unique identifier"). Only this element enables the payment system or the bank system to identify two information packages and link them with each other.

This approach can be used both in real transactions, with POS systems, and in internet transactions.

The invention comprises a method for performing a digital transaction via a mobile device using a POS system. Hereby, the method the following steps:
  generation of a unique one-time digital code by the POS system (or by the mobile device of the customer), which identifies the transaction;
  transmission of the transaction data with the unique one-time digital code to a bank of the owner of the POS system via a first digital network path;
  parallel transmission of the unique one-time digital code and the account information released by the mobile device to the bank via a second digital network path;
  merging by the bank (or by the payment system/transaction network) of the transaction data from the POS system and the account information released by the mobile device and clearance for the transaction if the merging is successful. Merging is always successful if the codes match. In this way a bank is notified of approval for the transaction via different paths, which are merged at the bank.

To ensure that the bank recognises the account data, the account data are, for example, stored in an internet service such as an email account or an account in a social network and, by logging on to this internet service, the mobile device can release a transmission of the account data and the digital code. In this case, the code can be entered manually or automatically into the device, as will be explained below. Along with web-based social network services are also web-based email services, instant messaging services, mobile payment (digital wallet) services, online stores. Payment Systems comprise traditional systems like VISA® or MasterCard® or alternative transaction networks. A mobile device can be a smartphone, digital watch, tablet, digital bracelet, digital ring, or digital key fob, or RFID sticker.

The unique identifier can also be entered via a pattern password, (pattern lock), depicted on the POS device or on the sales receipt. Voice input is also conceivable. Automatic transmission by NFC during the connection with the POS device is described below.

In a further embodiment, the unique one-time digital code can only be used once for connection to a wireless local area network of the POS system, wherein, due to the connection, a IMSI, IMEI or MAC address of the mobile device is requested which is incorporated in the transaction data, wherein the mobile device transmits the IMSI, IMEI or MAC address to the bank in parallel and clearance is only provided for a transaction if the IMSI, IMEI or MAC addresses also match. This means that not only the code but also the address of the mobile device of the customer is checked. In an alternative embodiment, the IMSI, IMEI or MAC address is actually the code. It could be not only IMSI, IMEI or MAC address, but any other unique identification number of the mobile device of the customer.

In the preferred embodiment, the unique one-time digital code is printed out on a receipt by the POS system so that this can then be manually keyed in the mobile device. Alternatively, the code can also be sent to the mobile device via a network. In this case, the unique one-time digital code is sent via a wireless connection from the POS system to the mobile device, preferably by NFC or Bluetooth or WLAN so that the mobile device can forward the data without manual keying-in.

The network of the POS system identifies the mobile device at the time of its connection to the network from an IMSI number (International Mobile Subscriber, Identity) or IMEI (International Mobile Equipment Identity), or MAC (Media Access Control Address) or any other unique identification number of the mobile device and forwards the data to the POS system.

In addition, an inquiry to a telephone service provider enables the position coordinates of the mobile device and the actual geographic position of the POS system to be compared and if the coordinates do not match, the transaction can be blocked. Hence, the coordinates can be a further comparison criterion in order to merge the data reliably and release the transaction.

Following a successful conclusion of the transaction, access to the local area network on the basis of the code is automatically disconnected. In this case, the wireless local area network is a WiFi (hereinafter—"WiFi" or "WLAN").

In a further embodiment, the invention comprises a system, comprising a mobile device, a POS system and a bank system, characterised by a mechanism that implements the method according to one or more of the preceding claims.

In addition, with respect to the internet, the invention relates to a method for performing a digital transaction via a mobile device using a POS system connected to a wireless local area network comprising the following steps:
  generation of a unique one-time digital code by the POS system that is used for initiating the transaction;
  automatic enabling of network access to the wireless local area network after production of the unique one-time digital code, wherein access to the wireless network is permitted by the digital code;

connection of the mobile device with the local area network using the digital code and provision of information from the mobile device of the customer to the POS system, after the information has been obtained by the POS system from the mobile device of the customer, the POS system provides clearance for the transaction.

The wireless network is preferably a WLAN network embodied in the local point-of-sale area. In a preferred embodiment, the POS system uses a user account to manage the assignment of the identity of the mobile device to a customer account in that the bank information, such as credit card information or account number, bank sort code etc., are stored. The effect of the assignment of the MAC address to this transaction information is that the owner of the mobile device does not have to transmit any further account data. The MAC address is used to establish an assignment to the account data and a clearance can be provided. To avoid fraud, data on the mobile provider is also stored with the customer data so that the mobile provider can check whether the device is actually moving in the areas of the location of the cash register and the MAC address has not been stolen. In addition to the MAC address, it is also possible to use other identifiers of the mobile device, as described below. Alternatively, the mobile device account transmits data by means of an application on the mobile device to a destination address in the mobile network. The provider of the mobile network of the mobile device can again use the unique identifier and the account data to check the location of the mobile device and the mobile provider can provide clearance. It should be noted that it is also possible to debit the account of the mobile provider so that the invoicing can take place via the telephone bill.

In the preferred embodiment, the unique digital code is only used once for connection to the wireless local area network. Hence, it is a unique code which does not permit access after one single use.

The unique one-time digital code can contain any number of digits or letters. However, with manual input, the customer may enter the last four numbers only. The unique code can be generated randomly or can be setup by different elements of the transaction like, amount of money to be paid, seller information, buyer information, number of the device of the user, or any other unique identification number of the mobile device. The generation of the unique code can be performed by generating of the unique code by the seller and forwarding it to the buyer, or the unique code is generated by the smartphone or a mobile watch or another mobile device and is forwarded to the seller.

The system can generate a fairly long code (to ensure that no repetitions occur in the case of numerous purchases), but in this case selects either the first or last four (for example) symbols as a unique code for entering the local WiFi/WLAN network.

As soon as the abbreviated code has been entered, the system forwards the complete (long) original code to the smartphone.

The unique one-time digital code can be transmitted in various forms. The unique one-time digital code can be printed out on a receipt by the POS system so that this can then be manually keyed into a mobile device. In an alternative embodiment, it is also generated as a barcode which can then be read by an application in the mobile device. This barcode can, as a rule, be detected via the camera of the mobile device. In an alternative embodiment, the receipt can also be transmitted to the mobile device via a mobile radio interface by Bluetooth, NFC or as an SMS. If a special application is installed on the mobile device, this code can be interpreted in the same way and used for authorisation in the mobile network. Preferably, the user still has to confirm the entry before access to the mobile network or wireless network is enabled.

In the first information flow, a code for network access is entered. The customer is then in the network; the network is then able to assign the customer's MAC address and, after this, the customer is separated from the network. Following this, the POS system sends an information package (containing the purchaser's MAC address, the payment amount, the unique one-time digital code, vendor's own information) to the payment system (e.g. Bank or VISA etc).

In parallel, in the second information flow, the smartphone sends the unique one-time digital code to the application provider/social network (e.g. Facebook or Googlemail). The application adds the purchaser's the bank details to the information package and sends it to the payment system (e.g. Bank or VISA etc). The payment system compares the two information packages. The vendor receives a commitment from the payment system. The customer's bank receives a commitment from the payment system.

In the case of non-manual code entry, automatic entry by NFC technology is possible.

To achieve access to the local mobile/wireless network, the POS system is connected to a control system for the mobile network in order to exchange the digital code. For example, the control system can control access points for the cableless network via the RADIUS protocol. If a user is to log-in to the cableless network, corresponding requests can be put to the control system from the cableless network's access point. Obviously, other technologies are conceivable. However, in principle, a standard should be used to control the cableless access points so that the unique password is used effectively. When a log-in has been performed and the necessary data have been exchanged, the control system immediately resets the access.

In one possible embodiment, as described above, an application runs on the mobile device via which the digital code is entered and a log-in to the mobile network takes place and wherein, after the log-in, account information, credit-card information or IMSI information are transmitted to the mobile network from the application in order to conclude a transaction. In order to communicate the information to the correct place in the network, during the mobile device log-in, an address is transmitted, (for example via the DHCP protocol) to which the relevant identification data of the mobile device are to be transmitted. This makes it possible also to transmit account information and further details. On log-in to the mobile network, a network address is notified to the mobile device to which the account information, credit-card information or IMSI information is to be transmitted. When this information has been obtained, this information is as a rule only transmitted on the basis of an approval. It is also possible to request certificates and similar details in order to ensure that only trusted entities receive this information.

In an alternative embodiment, the control system for the mobile network addresses the mobile device after the log-in via the network in order to obtain information for the performance of a digital transaction by the mobile device. Thereupon, the network's control system identifies the mobile device at the time of its connection (by an IMSI— number (International Mobile Subscriber, Identity) or IMEI (International Mobile Equipment Identity), or MAC (Media Access Control address) or any other unique identification number of the mobile device) and forwards the data to the POS system.

If a customer account exists with the company, the POS system uses the network identification to access a database in which the account information and/or a network provider is stored in relation to the network identification.

As described above, the transaction data and/or the identification by the POS system enables access data to be transmitted by a telephone service provider via a telephone network to the mobile device, wherein the telephone service provider checks the correctness of the identification. For this, the telephone service provider checks the IMSI, IMEI or MAC. Preferably, the telephone service provider checks the position coordinates of the mobile device and the actual geographic position of the POS system in that he compares them and, if the coordinates do not match, the transaction can be blocked or a corresponding warning message sent to the POS system.

If it should be found that both the transaction data and the position coordinates are correct, the transaction data are transmitted to a corresponding clearing house (a bank), which ultimately performs the transaction on the bank systems.

Following a successful conclusion of the transaction, access to the local area network on the basis of the code is automatically disconnected.

DETAILED DESCRIPTION

The idea is based on the separation the information flows from the purchaser and vendor at the time of the purchase. Each party sends its information package to the payment system via its communication channel. Therefore, two independent information packages are sent to the payment system with each purchase.

In this case, each information package contains an obligatory element—a unique one-time number of the sales receipt. Only this element enables the payment system to find two information packages and link them to each other.

Figure 1:
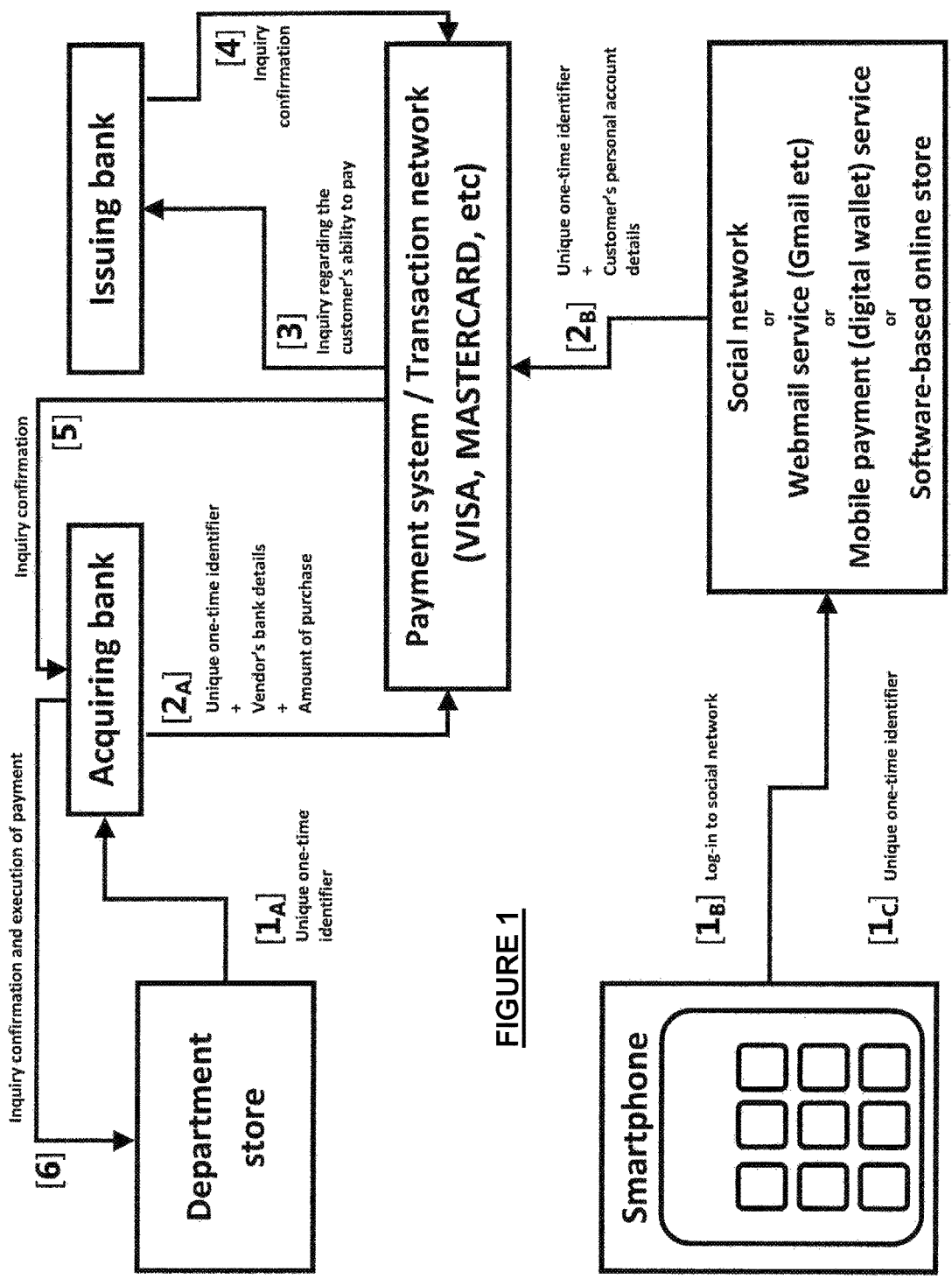
FIG. 1 is a schematic diagram of the course of the method without WLAN.

FIG. 1 is a schematic diagram of the course of a method with which no WLAN is used and payment takes place in the internet.

The basic element is that the purchaser is a user of a social network/messenger in that he has specified his payment details. This achieves a single transmission of information on the payment from the purchaser and vendor. In this case, a unique one-time number of the sales receipt is used to facilitate the connection.

According to FIG. 1, the following is performed in Step 1A.

A unique one-time number of the sales receipt is generated by the online handler (or, alternatively, by the purchaser).

The online handler sends a unique one-time number of the sales receipt to the payment system (together with the amount of the payment and its own bank details) (1A).

In parallel to this, the purchaser logs-in to his social network or has already logged-in (1B).

The purchaser sends the unique one-time number of the sales receipt to the social network/email/messenger (1C). The social network/email/messenger sends this the unique one-time number of the sales receipt with the personal purchaser data to the payment system (2B). The payment system receives two information packages with the same unique one-time number of the sales receipt and combines them for the processing (2A). The payment system then checks the customer's ability to pay (3) with the card-issuing bank and if appropriate receives an inquiry confirmation (4). The payment system then sends an inquiry confirmation (5) to the acquiring bank, which is then forwarded again to the department store (6) or the POS system which release the information for the payment.

Figure 2:
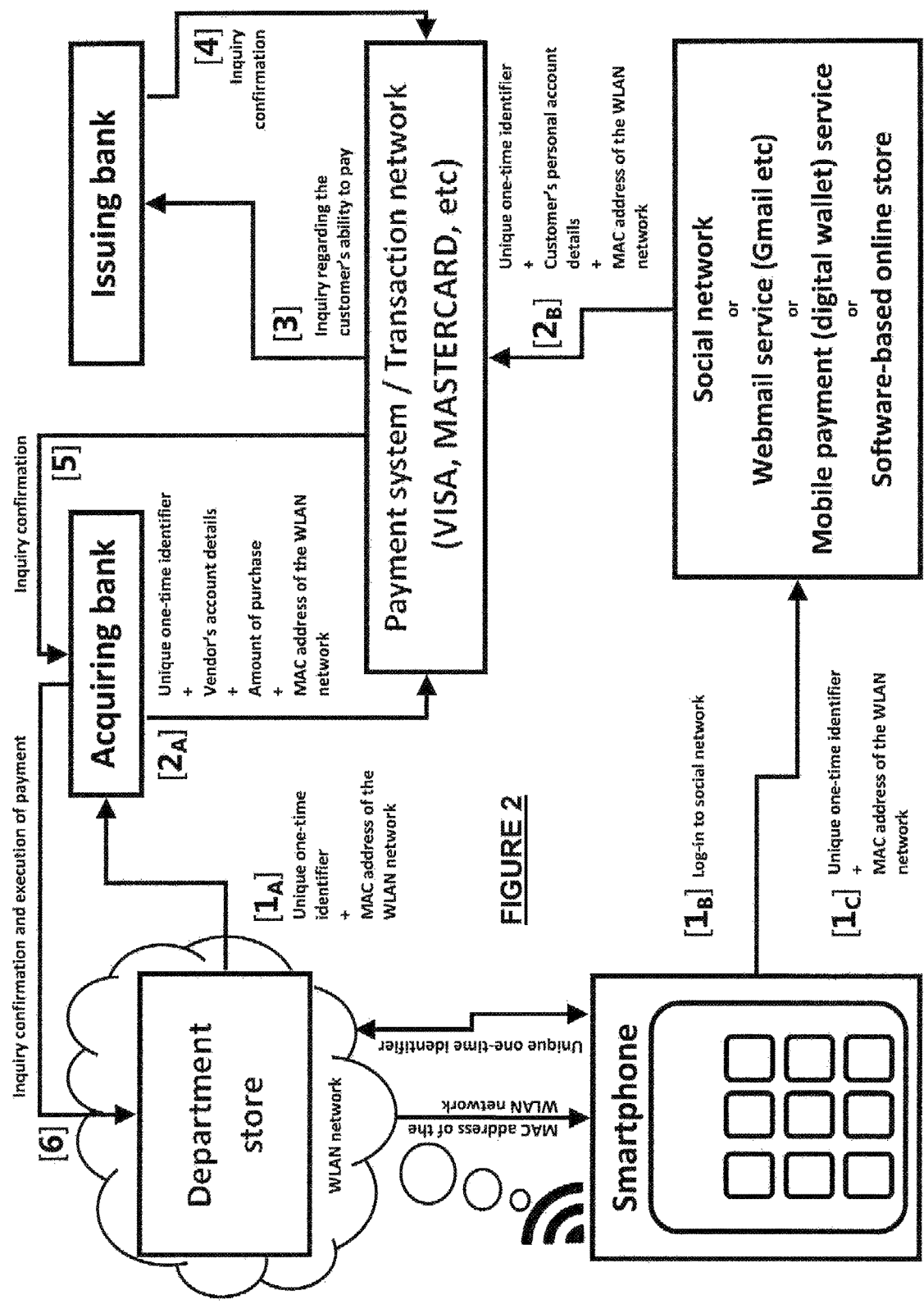
FIG. 2 is a schematic diagram of the course of the method with WLAN.

In FIG. 2, the basic elements are that the purchaser is a user of a social network/email/messenger to which he has given his payment details. A single split transmission of information on the payment from purchaser and vendor takes place. The unique one-time number of the sales receipt is used to facilitate connection between two information packages. Besides, the MAC address of the WLAN-network of the vendor (department store, café, multi-storey car park etc.) is used to facilitate the connection between two information packages. In principle, the handling sequence is similar to that in FIG. 1, but here each information package contains a MAC address for the vendor's WLAN network.

In addition to the unique one-time number of the sales receipt, the MAC address can be used to merge both information packages by the payment system. The purchaser looks for the WLAN network of the vendor in his smartphone and logs-in with a password (the unique one-time number of the sales receipt).

The smartphone receives information on the MAC address of the vendor's WLAN network, which is also sent to the payment system.

The vendor's WLAN network receives a signal relating to the desired purchase and sends the data to the payment system (1).

The further steps correspond to FIG. 1 wherein additionally the MAC address of the WLAN network is compared.

FIG. 3 again shows a modified version. Once again, the basic elements are that the purchaser is a user of a social network/messenger where he has specified his payment details. A single split transmission of information on the payment of the purchaser and vendor takes place. The use of the unique one-time number of the sales receipt as a connection possibility between two information packages is merged using the MAC address of the WLAN network of the vendor (department store, café, multi-storey car park etc) and using the MAC address of the purchaser. This causes 3 parameters to be compared.

The handling sequence is the same as with variants 1 and 2, but here each information package also contains a MAC address of the purchaser's smartphone.

In addition to the unique one-time number of the sales receipt, this MAC address is used for the merging on the part of the payment system.

The purchaser looks for the vendor's WLAN network in his smartphone and logs-in using a password (the unique one-time number of the sales receipt).

The vendor's WLAN network receives the MAC address of the purchaser's smartphone and vice versa. Each party sends the MAC address of its contractor together with the complete information package to the payment system. (1) (2) (3)

In this case, both MAC addresses are additional components in the search for two information packages sent to the payment system during the course of a purchase.

Figure 3:
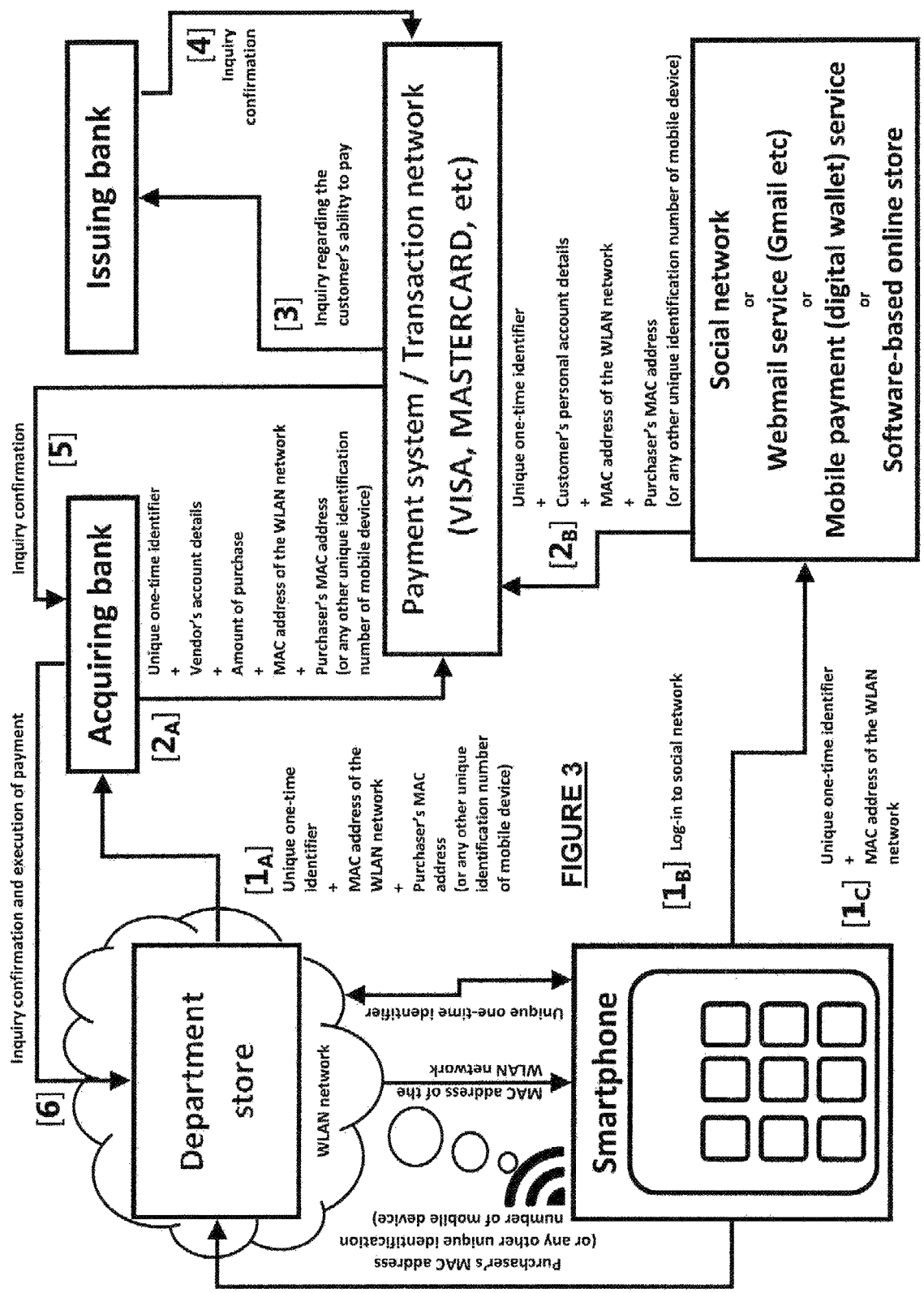
FIG. 3 is a schematic diagram of the course of the method with WLAN and MAC address.

FIGS. 2 and 3 are schematic diagrams of the course of the present method. In a first step, a POS system generates a sales slip for a transaction with a unique access password for the wireless local area network. The POS system forwards this number to an access control system, which is responsible for access to the mobile local area network. When the mobile device has logged-in, the POS system receives the corresponding information on the log-in from the access system (which is not shown). The POS system then asks the department store's bank whether an account is linked to the identification of the mobile device on which the corresponding bank details of the customer are stored. The acquiring bank then forwards this to a payment system (VISA, MasterCard) which also obtains information from the social network. In the event that the identification of the mobile device also matches the location, which was requested from the telephone service provider, additional data are available. If the telephone service provider establishes that the location and identification of the mobile device match and there is no unauthorised use, feedback is sent to the payment system. The server system in turn notifies the store's bank of this in order to ensure that there is no unauthorised use. When these details have been exchanged, the payment system concludes the transaction via the issuing bank. When this has taken place, a remittance is transmitted to the department store. The POS system is also informed of the successful conclusion of the transaction.

Figure 4:
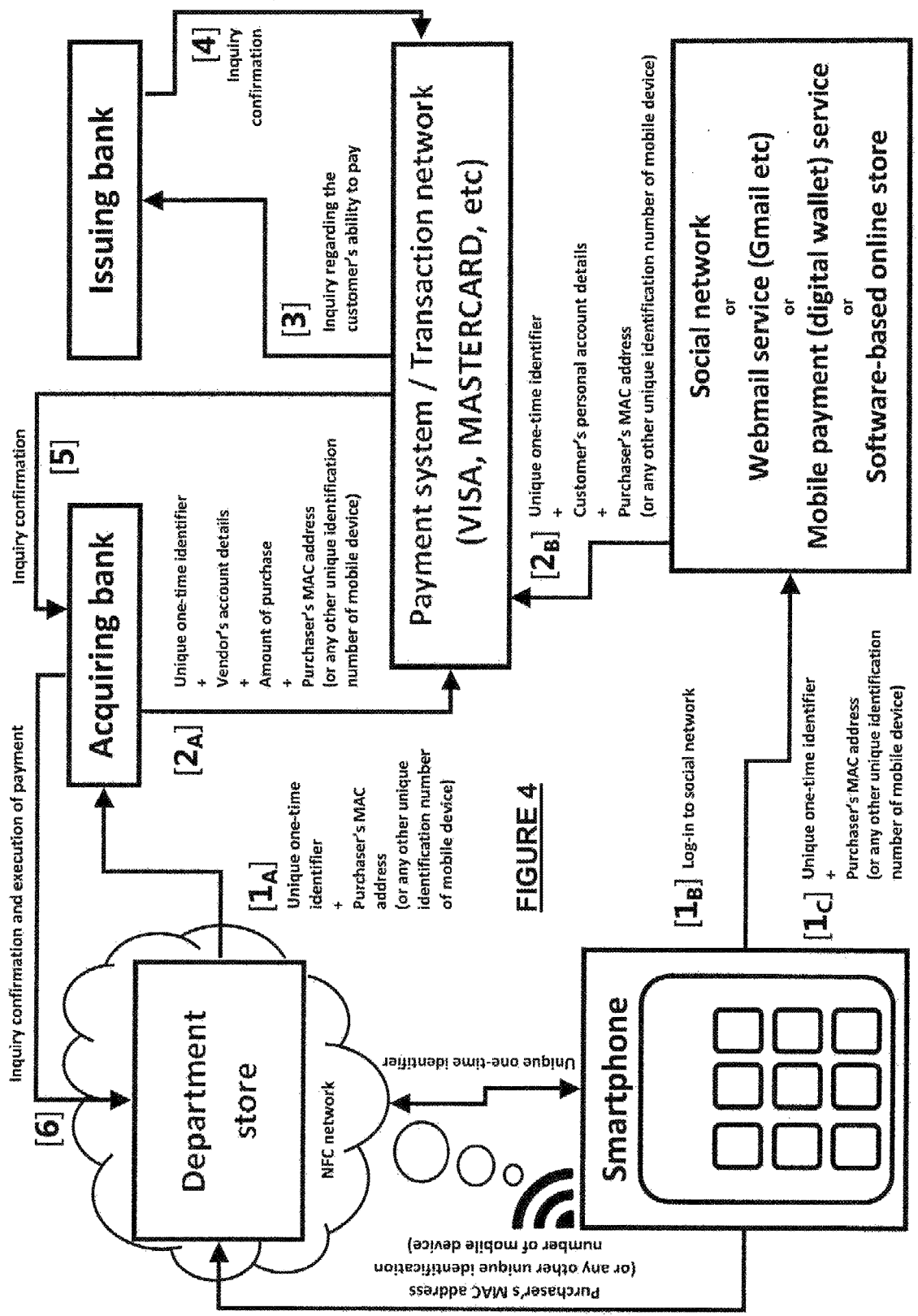
FIG. 4 is a schematic diagram of the course of the method, wherein the identification is entered on the mobile device not manually, but by NFC network.

FIG. 4 additionally shows that the unique one-time number of the sales receipt is transmitted between the smartphone and the POS system via a NFC network. This sends the data then to the social network or network services, which then in turn forward the data again to the bank. In parallel, the data is also transmitted from the department store to the bank.

In one possible embodiment, the method takes place as follows:

The purchaser selects the goods [or a product or service in the café]. The following describes the sequence of activities when purchasing the goods and paying for the goods or services (the recipient of the money is called the "department store [café]"). The cash register/POS system in the department store [café] is directly or indirectly connected to the wireless local area network of the department store [café]. There is at least a connection to a control system, which manages access to the mobile network. The control system can, for example, specify access for the authentication via control units and standard protocols.

The employee of the department store [café] scans in the selected goods, a receipt number with a final amount for the purchase is generated by the cash machine/ POS system (the vendor can be replaced by a computer). The number is preferably a random number generated by a generator.

On the purchase and during the payment, a unique receipt, or voucher number is generated. There can be any number of digits (number sequence).

On the generation of the sales voucher, a unique password/access for network access is generated for the WLAN of the department store [café]:
a) either with a number sequence, which exactly matches the sales slip number b) or with a completely different number, but which is "connected" to the sales slip number so that the user recognises this.

This can be an N-position code as a password. This is convenient and customer-friendly and suitable for recognition and quick entry.

This unique password is only valid for one single network access by an external device.

The customer sees on his smartphone a list of the possible wireless networks, selects the network required at the time and activates this via the code. The WLAN of the café or department store requests a password for enabling.

The customer enters the N-number of his sales receipt as a code. The WLAN usage by the customer and the entry of the sales receipt number (simultaneously a password) confirms the customer's desire to debit a specific amount from his account. Here, the account can be a local account at the vendor's side on which the unique identification number of the mobile device and the bank information are stored. Alternatively, the network identification can also be used to establish the mobile radio provider and a debit can be taken via the telephone invoice. In a further embodiment, the mobile device transmits bank information (credit card, EC card etc.).

The temporary connection to the WLAN of a café or department store does not per se in principle provide the customer with any further network options (such as, for example, the possibility of internet access) apart from confirmation of the wish to pay a specific amount (on the sales slip).

The WLAN of a café or department store initialises the smartphone at the time of its connection (by an IMSI—number (International Mobile Subscriber Identity) or IMEI (International Mobile Equipment Identity), or MAC (Media Access Control Address) or any other unique identification number of the mobile device) and forwards the data to the payment system.

The data can be transmitted via the sales receipt by a telephone service provider (in this case, the telephone service provider recognises the individual features of the customer via his smartphone).

Comment: the telephone service provider can serve as an additional safety filter for the customer—the actual MAC address is also checked (in the event of the unauthorised use of this address).

If the telephone service provider receives a question about a customer identification through its smartphone from the café or department store, it can compare the GPS coordinates of the smartphone with the actual geographical position of the department store or café. If the coordinates do not match, the transaction can be blocked.

A further checking variant could be—the telephone service provider can ascertain the location of the smartphone from its IMSI/IMEI/MAC number (or any other unique identification number of the mobile device). This location then has to be compared with the actual geographical position of the café or department store.

The payment system forwards its question to the issuer (to the bank which issued credit, or EC card to the customer or opened the customer account) and receives an approval or rejection depending upon the customer's ability to pay. The department store/café is then informed whether the transaction can take place.

Access by a customer smartphone to the WiFi/WLAN of the department store or café is automatically disconnected following a successful payment.

The following should also be noted:

Other intermediaries between the payment system and vendors are possible. For example, a social network application can be installed in the customer smartphone. This application can take over the function of forwarding the individual customer characteristics to the payment system.

Another connection between the vendor and the principal bank is also conceivable such as a direct connection past the telephone service provider to the traditional payment system.

The invention claimed is:

1. A method for performing a financial transaction via a mobile device and a point-of-sale (POS) system, the method comprising the steps of:
   utilizing the POS system to generate a unique digital code that identifies the financial transaction;
   communicating the unique digital code from the POS system to the mobile device;
   connecting the mobile device to a wireless network associated with the POS system, wherein the mobile device uses the unique digital code as a password to connect to the wireless network, the unique digital code is a one-time code that can only be used once as the password;
   forwarding, from the mobile device to the wireless network, a mobile identifying code that identifies the mobile device, the mobile identifying code including at least one of an international mobile subscriber identity (IMSI) number, an international mobile equipment identity (IMEI) number, and a media access control (MAC) address;
   forwarding, from the wireless network to the mobile device, a network identifying code that identifies the wireless network, the network identifying code including at least one of an IMSI number, an IMEI number, and a MAC address;
   generating transaction data associated with information regarding the financial transaction;
   transmitting the transaction data, the unique digital code, the mobile identifying code, the network identifying code, and account information associated with the POS system from the POS system to a payment system via a first digital network path;
   transmitting in parallel the unique digital code, the mobile identifying code, the network identifying code, and account information associated with a user of the mobile device from the mobile device to the payment system via a second digital network path;
   determining, by the payment system, whether the unique digital code, mobile identifying code, and network identifying code transmitted from the POS system via the first digital network path matches the unique digital code, mobile identifying code, and network identifying code transmitted by the mobile device via the second digital network path; and
   offering clearance of the financial transaction by the payment system when the codes transmitted from the POS system match the codes transmitted by the mobile device.

2. The method of claim 1, wherein the step of communicating the unique digital code from the POS system to the mobile device further comprises:
   utilizing the POS system to print out the unique digital code on a receipt; and
   allowing a user of the mobile device to manually enter the unique digital code in the mobile device.

3. The method of claim 1, wherein the step of communicating the unique digital code from the POS system to the mobile device further comprises transmitting the unique digital code via near field communication (NFC), short message service (SMS), Wi-Fi, or Bluetooth.

4. The method of claim 1, wherein the step of communicating the unique digital code from the POS system to the mobile device further comprises:
   utilizing the POS system to display a barcode that encodes the unique digital code; and
   utilizing the mobile device to capture an image of the barcode.

5. The method of claim 1, wherein the step of transmitting the transaction data, the unique digital code, the mobile identifying code, the network identifying code, and account information associated with the POS system from the POS system to the payment system further comprises the steps of:
   transmitting the transaction data, the unique digital code, the mobile identifying code, the network identifying code, and the account information associated with the POS system from the acquiring bank to the payment system.

6. The method of claim 1, wherein the step of transmitting in parallel the unique digital code, the mobile identifying code, the network identifying code, and account information associated with a user of the mobile device from the mobile device to the payment system further comprises the steps of:
   transmitting the unique digital code, the mobile identifying code, and the network identifying code from the mobile device to a network service; and
   forwarding the unique digital code, the mobile identifying code, the network identifying code, and the account information associated with the user of the mobile device from the network service to the payment system.

7. The method of claim 6, wherein the network service includes one of a social network service, an electronic mail service, a mobile payment service, and an online financial service.

8. The method of claim 6, wherein the network service is configured to store the account information associated with the user of the mobile device.

9. The method of claim 1, wherein the payment system is associated with at least one of an issuing bank, a credit card association, and a financial transaction network.

10. The method of claim 1, further comprising the steps of:
    utilizing a telephone service provider that provides service for the user of the mobile device to obtain position coordinates of the mobile device;
    comparing the position coordinates with a geographical position of the POS system;
    blocking the financial transaction if the position coordinates of the mobile device do not match the geographical position of the POS system; and
    authorizing the financial transaction if the position coordinates of the mobile device match the geographical position of the POS system.

11. The method of claim 1, further comprising the step of disconnecting the connection between the mobile device and the wireless network at the conclusion of the financial transaction.

12. A system for performing a financial transaction, the system comprising:
    a point-of-sale (POS) system configured to generate a unique digital code that identifies a financial transaction to be conducted with a customer, the POS system further configured to generate transaction data associated with information regarding the financial transaction;

a mobile device associated with the customer, the mobile device configured to receive the unique digital code from the POS system;

a wireless network associated with the POS system, the wireless network enabling connection between the mobile device and the POS system, wherein the mobile device uses the unique digital code as a password to connect to the wireless network, the unique digital code being a one-time code that can only be used once as the password, the wireless network configured to receive a mobile identifying code that identifies the mobile device, the mobile identifying code including at least one of an international mobile subscriber identity (IMSI) number, an international mobile equipment identity (IMEI) number, and a media access control (MAC) address, and wherein the mobile device is configured to receive a network identifying code that identifies the wireless network, the network identifying code including at least one of an IMSI number, an IMEI number, and a MAC address; and a payment system;

wherein the POS system is configured to transmit the transaction data, the unique digital code, the mobile identifying code, the network identifying code, and account information associated with the POS system to the payment system via a first digital network path;

wherein the mobile device is configured to transmit in parallel the unique digital code, the mobile identifying code, the network identifying code, and account information associated with the customer to the payment system via a second digital network path;

wherein the payment system is configured to determine whether the unique digital code, mobile identifying code, and network identifying code transmitted from the POS system via the first digital network path matches the unique digital code, mobile identifying code, and network identifying code transmitted by the mobile device via the second digital network path; and wherein the payment system is further configured to offer clearance of the financial transaction when the codes transmitted from the POS system match the codes transmitted by the mobile device.

13. The system of claim 12, wherein the POS system is configured to print out the unique digital code on a receipt to allow the customer to manually enter the unique digital code in the mobile device.

14. The system of claim 12, wherein the POS system is configured to communicate the unique digital code to the mobile device by transmitting the unique digital code via near field communication (NFC), short message service (SMS), Wi-Fi, or Bluetooth.

15. The system of claim 12, wherein the POS system is configured to communicate the unique digital code to the mobile device by displaying a barcode that encodes the unique digital code and allowing the mobile device to capture an image of the barcode.

16. The system of claim 12, further comprising an acquiring bank, wherein the POS system is configured to transmit the transaction data, the unique digital code, the mobile identifying code, and the network identifying code to the acquiring bank and the acquiring bank is configured to forward the transaction data, the unique digital code, the mobile identifying code, the network identifying code, and the account information associated with the POS system to the payment system.

17. The system of claim 12, further comprising a network service, wherein the mobile device is configured to transmit the unique digital code, the mobile identifying code, the network identifying code, and account information associated with the customer to the network service and the network service is configured to forward the unique digital code, the mobile identifying code, the network identifying code, and the account information associated with the user of the mobile device from the network service to the payment system.

18. The system of claim 17, wherein the network service includes one of a social network service, an electronic mail service, a mobile payment service, and an online financial service, and wherein the network service is configured to store the account information associated with the user of the mobile device.

19. The system of claim 12, wherein the payment system is associated with at least one of an issuing bank, a credit card association, and a financial transaction network.

20. The system of claim 12, further comprising a telephone service provider that provides service for the user of the mobile device, wherein the telephone service provider is configured to obtain position coordinates of the mobile device and compare the position coordinates with a geographical position of the POS system, and wherein the payment system is configured to block the financial transaction if the position coordinates of the mobile device do not match the geographical position of the POS system and to authorize the financial transaction if the position coordinates of the mobile device match the geographical position of the POS system.

* * * * *